(12) United States Patent
Sun

(10) Patent No.: US 11,038,828 B2
(45) Date of Patent: Jun. 15, 2021

(54) AUTOMATIC DISPLAY OF SESSION INTERFACE FOR COMMUNICATION WITH NEIGHBORING DEVICE

(71) Applicant: Alibaba Group Holding Limited, Grand Cayman (KY)

(72) Inventor: Jiankang Sun, Zhejiang (CN)

(73) Assignee: Alibaba Group Holding Limited

(*) Notice: Subject to any disclaimer, the term of this patent is extended or adjusted under 35 U.S.C. 154(b) by 0 days.

(21) Appl. No.: 16/539,215

(22) Filed: Aug. 13, 2019

(65) Prior Publication Data

US 2019/0364005 A1 Nov. 28, 2019

Related U.S. Application Data

(63) Continuation of application No. PCT/CT2018/075249, filed on Feb. 5, 2018.

(30) Foreign Application Priority Data

Feb. 14, 2017 (CN) .......................... 201710080044.3

(51) Int. Cl.
*H04W 24/00* (2009.01)
*H04L 12/58* (2006.01)
*H04W 4/021* (2018.01)

(52) U.S. Cl.
CPC ............ *H04L 51/20* (2013.01); *H04L 51/043* (2013.01); *H04W 4/021* (2013.01)

(58) Field of Classification Search
CPC ....... H04L 51/20; H04L 51/043; H04W 4/021
(Continued)

(56) References Cited

U.S. PATENT DOCUMENTS 5,854,785 A 12/1998 Willey
6,516,345 B1 2/2003 Kracht
(Continued)

FOREIGN PATENT DOCUMENTS

CN 101808090 8/2010
CN 102595247 7/2012
(Continued)

OTHER PUBLICATIONS

CN 1st Office Action dated Nov. 4, 2020 for CN application No. 201710080044.3, a counterpart foreign application for U.S. Appl. No. 16/539,215, 8 pages.
(Continued)

*Primary Examiner* — Amancio Gonzalez
(74) *Attorney, Agent, or Firm* — Lee & Hayes, P.C.

(57) ABSTRACT

Communication methods and apparatuses are provided in the present disclosure. A method may include detecting neighboring devices within a preset range in a vicinity of an electronic device, the electronic device having a first client of a preset communication application running thereon; determining a communication object corresponding to a second client of the preset communication application running on a neighboring device in response to detecting that the neighboring device exists in the vicinity of the electronic device; and displaying a communication session interface associated with the preset communication application on the electronic device, the communication session interface being used for implementing a communication session for the communication object. Using technical solutions of the present disclosure, communication session interface(s) can be automatically started for neighboring device(s) in a vicinity of an electronic device, thereby improving the efficiency of communication and simplifying user operations.

20 Claims, 13 Drawing Sheets

(58) Field of Classification Search
USPC .................................................... 455/456.1
See application file for complete search history.

(56) References Cited

U.S. PATENT DOCUMENTS

| | | | |
|---|---|---|---|
| 7,624,185 B2* | 11/2009 | Miller | H04L 29/06 709/223 |
| 7,809,842 B2* | 10/2010 | Moran et al. | 709/227 |
| 8,060,017 B2 | 11/2011 | Schlicht et al. | |
| 8,060,560 B2* | 11/2011 | Vonog | G06F 9/5072 709/203 |
| 8,208,634 B2 | 6/2012 | Hughes et al. | |
| 8,271,528 B1 | 9/2012 | Wilkinson et al. | |
| 8,271,529 B2* | 9/2012 | Qiu | G06Q 10/107 707/784 |
| 8,634,853 B2 | 1/2014 | Bogatin | |
| 9,369,177 B2 | 6/2016 | Hui et al. | |
| 9,401,863 B2 | 7/2016 | Hui et al. | |
| 9,654,960 B2 | 5/2017 | Zhou et al. | |
| 9,838,997 B2 | 12/2017 | Smith | |
| 9,913,082 B2* | 3/2018 | Ling et al. | |
| 9,990,621 B1* | 6/2018 | Ng | G06Q 20/202 |
| 10,057,720 B2* | 8/2018 | Tang | G08B 21/24 |
| 10,083,006 B1* | 9/2018 | Feuz | G06N 20/00 |
| 10,237,740 B2* | 3/2019 | Ciano | G06F 21/629 |
| 2005/0010323 A1 | 1/2005 | Cocciadiferro et al. | |
| 2012/0329475 A1* | 12/2012 | Ribaudo | H04L 51/20 455/456.1 |
| 2013/0169742 A1* | 7/2013 | Wu | H04N 7/152 348/14.08 |
| 2014/0195595 A1 | 7/2014 | Schwebke et al. | |
| 2016/0255025 A1* | 9/2016 | Valverde | G06F 40/169 715/716 |
| 2018/0196694 A1* | 7/2018 | Banerjee | G06F 9/466 |
| 2018/0337874 A1* | 11/2018 | Faulkner | H04L 12/1818 |
| 2019/0342753 A1* | 11/2019 | Zhu | H04W 12/0608 |

FOREIGN PATENT DOCUMENTS

| | | |
|---|---|---|
| CN | 103108326 | 5/2013 |
| CN | 105049338 | 11/2015 |
| CN | 105516897 A | 4/2016 |
| CN | 105530164 A | 4/2016 |
| CN | 105681161 | 6/2016 |
| CN | 105739953 | 7/2016 |
| CN | 105871567 | 8/2016 |
| CN | 106375843 A | 2/2017 |

OTHER PUBLICATIONS

CN 1st Search Report dated Oct. 30, 2020 for CN application No. 201710080044.3, a counterpart foreign application for U.S. Appl. No. 16/539,215, 2 pages.

PCT Search Report dated Apr. 17, 2018 for PCT application No. PCT/CN2018/075249, 4 pages.

* cited by examiner

AUTOMATIC DISPLAY OF SESSION INTERFACE FOR COMMUNICATION WITH NEIGHBORING DEVICE

CROSS REFERENCE TO RELATED PATENT APPLICATIONS

This application claims priority to and is a continuation of PCT Patent Application No. PCT/CN2018/075249 filed on 5 Feb. 2018, and is related to and claims priority to Chinese Patent Application No. 201710080044.3, filed on 14 Feb. 2017, entitled "Communication Method and Apparatus," which are hereby incorporated by reference in their entirety.

TECHNICAL FIELD

The present disclosure relates to the technical field of terminals, and particularly to communication methods and apparatuses.

BACKGROUND

In related technologies, mutual communications between communication objects can be implemented by running clients of a preset communication application on electronic devices accordingly. A process of communication between a communication object A and a communication object B is used as an example. The communication object A needs to open a communication session interface corresponding to the communication object B in a client running on an electronic device, and then complete an input operation of communication content in the communication session interface.

However, a process of starting a communication session interface often takes a lot of time, which results in an inefficient communication.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of this, the present disclosure provides a communication method and an apparatus thereof, which can automatically open a corresponding communication session interface for a neighboring device in the vicinity of an electronic device, thereby improving the efficiency of communication and simplifying user operations.

To achieve the above objectives, the present disclosure provides the following technical solutions.

In implementations, a communication method is proposed, which includes: detecting neighboring device(s) within a preset range in a vicinity of an electronic device, the electronic device having a first client of a preset communication application running thereon; determining a communication object corresponding to a second client of the preset communication application running on a neighboring device in response to detecting that the neighboring device exists in the vicinity of the electronic device; and displaying a communication session interface associated with the preset communication application on the electronic device, the communication session interface being used for implementing a communication session for the communication object.

In implementations, a communication apparatus is provided, which includes: a detection unit that detects neighboring device(s) within a preset range from an electronic device, the electronic device having a first client of a preset communication application running thereon; a determination unit that determines a communication object corresponding to a second client of the preset communication application running on a neighboring device in response to detecting that the neighboring device exists in the vicinity of the electronic device; and a display unit that displays a communication session interface associated with the preset communication application on the electronic device, the communication session interface being used for implementing a communication session for the communication object.

In implementations, a communication method is proposed, which includes: detecting location change data of an electronic device, the electronic device having a first client of a preset communication application running thereon; when the electronic device is moved from a first location to a second location, determining, based on a neighboring device that exists in the vicinity of the second location, a communication object corresponding to a second client of the preset communication application running on the neighboring device; and displaying a communication session interface associated with the preset communication application on the electronic device, the communication session interface being used for implementing a communication session for the communication object.

In implementations, a communication apparatus is provided, which includes: a detection unit that detects location change data of an electronic device, the electronic device having a first client of a preset communication application running thereon; a determination unit, when the electronic device is moved from a first location to a second location, determines, based on a neighboring device that exists in the vicinity of the second location, a communication object corresponding to a second client of the preset communication application running on the neighboring device; and a display unit that displays a communication session interface associated with the preset communication application on the electronic device, the communication session interface being used for implementing a communication session for the communication object.

As can be seen from the above technical solutions, through an automatic detection operation of an electronic device, the present disclosure can actively display a corresponding communication session interface on the electronic device for a nearby neighboring device having a client of a preset communication application running thereon, without the need of a user to manually browse, find and open the communication session interface. This not only saves corresponding time and effort, but also greatly simplifies user operations and helps improving the efficiency of communications between communication objects.

DETAILED DESCRIPTION

Figure 1:
FIG. 1 is a schematic diagram of a session list page in the related technologies.

In the related technologies, when a user A wants to communicate with a certain communication object B through a preset communication application, a client of the preset communication application needs to be run on an electronic device used by the user first, and a communication session interface corresponding to the communication object B needs to be found and opened in the client. Such a process can usually be implemented in two ways as described in the following:

FIG. 1 is a schematic diagram of a session list page in the related technologies. As shown in FIG. 1, a session list page that is displayed in a client of a preset communication application includes a session interface entry corresponding to all communication session interfaces that the user A participates in. For example, FIG. 1 shows a session interface entry of a single-chat communication session interface between the user A and a user "Xiao Bai", a session interface entry of a group chat communication session interface corresponding to a group "serious working group" to which the user A belongs, etc. As such, the user A can browse through the session list page to find a session interface entry for a communication session interface of the communication object B, and enter the corresponding communication session interface by triggering the session interface entry.

Figure 2:
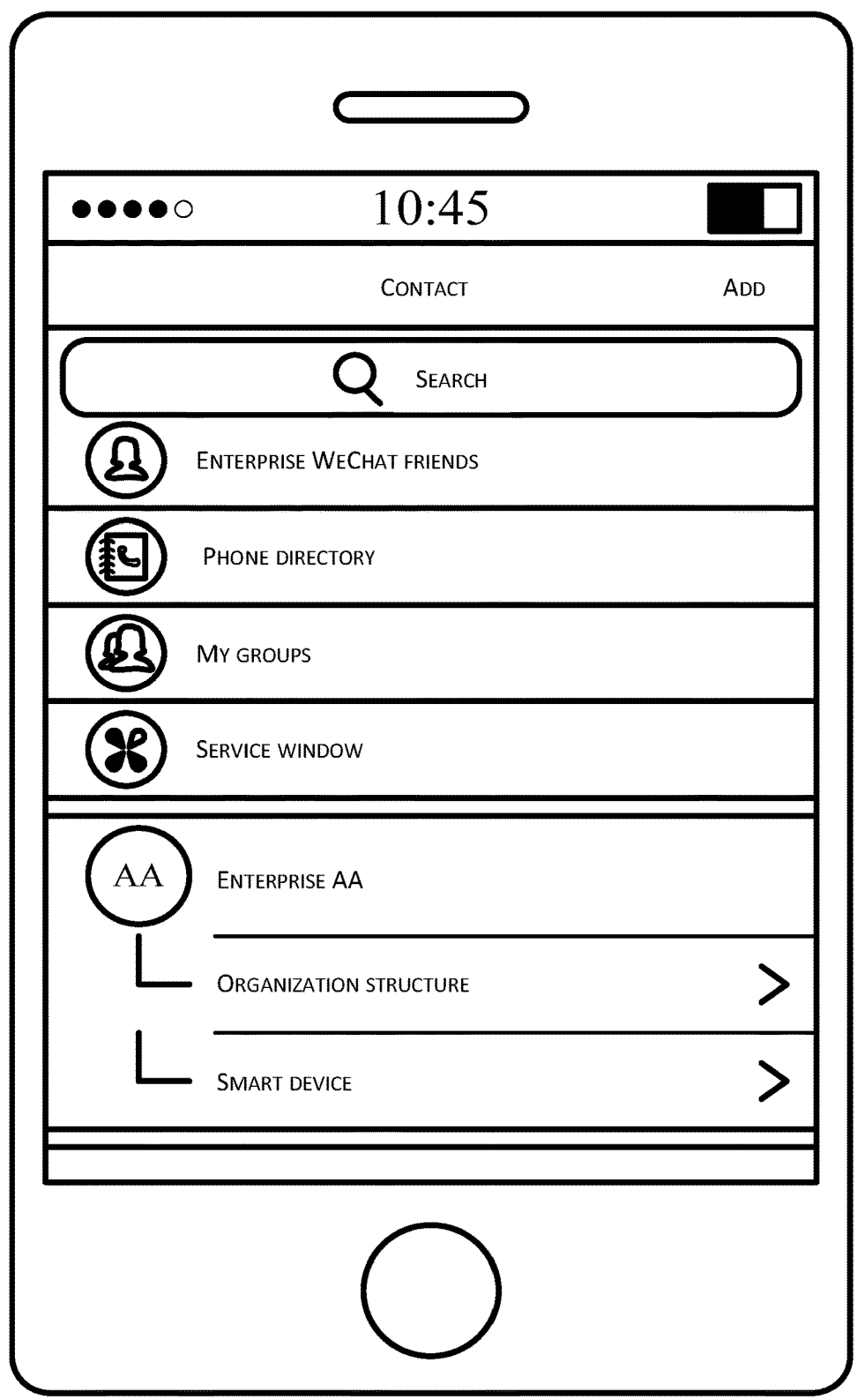
FIG. 2 is a schematic diagram of a contact page in the related technologies.

FIG. 2 is a schematic diagram of a contact page in the related technologies. As shown in FIG. 2, the user A can find contact information of the communication object B by searching or browsing in the contact page displayed in the client of the preset communication application, and trigger a communication session interface for the communication object B.

However, when the user A looks through the session list page as shown in FIG. 1 or the contact page as shown in FIG. 2, since the number of session interface entries and contact information may be very large, especially when the user A does not communicate with the communication object B very often, it will be difficult to quickly and accurately find the session interface entry or the contact information corresponding to the communication object B. When searching through the contact page as shown in FIG. 2, the user A needs to perform an additional operation of information input for the communication object B, which not only increases the complexity of operations of the user A, but also possibly lead to a failure in completion of a search operation when the user A is not familiar with the information of the communication object B.

Therefore, the present disclosure can solve the above technical problems in the related technologies by proposing new communication solutions. In order to further illustrate the present disclosure, the following examples are provided.

Figure 3A:
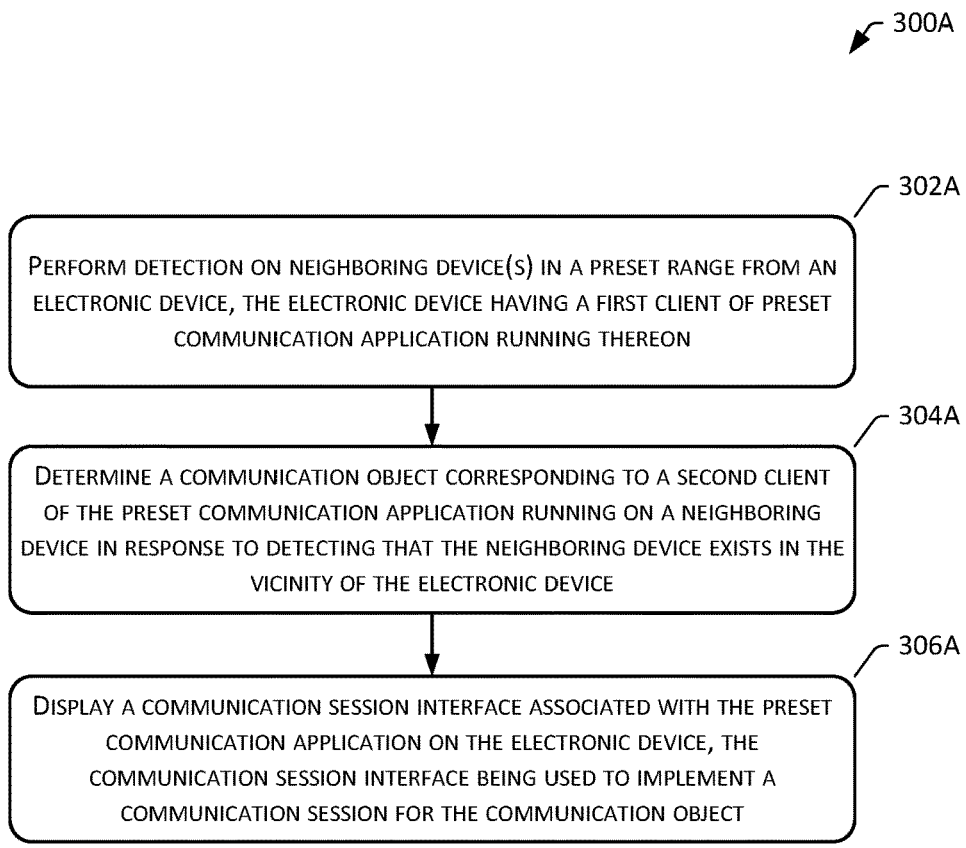
FIG. 3A is a flowchart of a communication method according to an exemplary embodiment of the present disclosure.

FIG. 3A is a flowchart of a communication method 300A according to an exemplary embodiment of the present disclosure. As shown in FIG. 3A, the method 300A is applied to an electronic device and may include the following operations.

Operation 302A: Perform detection on neighboring device(s) in a preset range from an electronic device, the electronic device having a first client of preset communication application running thereon.

In implementations, the preset communication application may be a mobile enterprise office platform. The mobile enterprise office platform can not only realize a communication function, but can also be used as an integrated function platform having a number of other functions, e.g., handling of internal events of an enterprise, such as approval events (such as leaves, office item applications, financial and other approval events), attendance events, task events, log events, etc., and processing of external events of the enterprise, such as ordering, purchasing, etc., which are not limited by the present disclosure.

More specifically, the mobile enterprise office platform can be hosted in an instant messaging application in the related technologies, for example, Enterprise Instant Messaging (EIM) applications, such as Skype For Business®, Microsoft Teams®, Yammer®, Workplace®, Slack®, Enterprise WeChat®, Fxiaoke®, Enterprise Feixin®, Enterprise Yixin®, etc. Apparently, an instant communication function is only one of a number of communication functions supported by the mobile enterprise office platform. The enterprise office platform can also implement more functions such as the above other functions, which are not exhaustively described herein.

It should be noted that an application program of a client of a mobile enterprise office platform can be pre-installed on an electronic device, so that the client can be launched and run on the electronic device. Apparently, when an online "client" such as HTML5 technology" is used, a corresponding application program does not need to be installed on the electronic device in order to obtain and run the client.

Operation 304A: Determine a communication object corresponding to a second client of the preset communication application running on a neighboring device in response to detecting that the neighboring device exists in the vicinity of the electronic device.

In implementations, the electronic device detects nearby neighboring devices according to a predefined near-field communication protocol. Since the near-field communication protocol uses wireless transmission and a transmission range thereof is limited, a detection of neighboring devices within a preset range around the electronic device can be made. For example, a neighboring device may periodically transmit a notification signal based on the near-field communication protocol, so that the electronic device can scan and find the notification signal transmitted by the neighboring device when the neighboring device is located within the preset range of the electronic device. When the near-field communication protocol is a Bluetooth Low Energy (BLE) protocol, the notification signal may be advertising information based on the BLE technology, etc. Apparently, the present disclosure is not limited to the type of near-field communication protocol as described above.

Furthermore, the electronic device may record identification information corresponding to the preset communication application in advance. When identification information included in the advertising message that is scanned and obtained by the electronic device includes such identification information, the electronic device can also actively wake up a client of the preset communication application even if the client of the preset communication application is not running on the electronic device. As such, the client can determine that a transmitter of the notification signal is a neighboring device that has a second client of the communication application running thereon based on the identification information included in the notification signal, and determine a communication object corresponding to the identification information.

In implementations, the communication object corresponding to the second client running on the neighboring device may be an ordinary user. Through the technical solutions of the present disclosure, a corresponding communication session interface is actively displayed, so that a fast communication can be realized between users. Especially when users want to transfer photos, pictures, videos, documents and other files, the efficiency of communication can be improved significantly. The communication object can also be a smart device, such as a smart printer, a smart projector, a smart set-top box, etc. Especially for a smart device having a relatively low frequency of use, a user often needs to take a longer time to find a corresponding session interface entry or contact information. Therefore, through the technical solutions of the present disclosure, a corresponding communication session interface can be actively displayed, which can significantly improve the efficiency of communication.

In implementations, the electronic device may detect a neighboring device, and the electronic device may directly display a corresponding communication session interface according to a communication object corresponding to the neighboring device.

In implementations, the electronic device may detect a plurality of neighboring devices at the same time.

In an example, the electronic device can directly display corresponding communication session interfaces according to communication objects corresponding to the plurality of neighboring devices. The communication session interfaces can be arranged in any manner, such as tiling, cascading, floating, etc., which are not limited by the present disclosure.

In another example, the electronic device may set a preset number, so that only a number (not greater than the preset number) of neighboring devices are selected, and corresponding communication session interfaces are displayed. The preset number may be one or more. The electronic device can select neighboring device(s) that is/are detected in various ways. For example, the preset number of neighboring devices can be selected in an order from the closest to the farthest from among the plurality of neighboring devices that are detected according to a distance between each neighboring device and the electronic device, and corresponding communication session interfaces are then displayed by determining communication objects corresponding to the selected neighboring devices. By screening the neighboring devices, the number of communication session interfaces that are displayed can be effectively controlled. Especially when the electronic device adopts a layout such as tiling, multiple communication session interfaces can be prevented from being too small when the communication session interfaces are tiled on a screen of the electronic device, by setting a preset number that match screen specifications of the electronic device, which helps a user to view and operate the communication session interfaces.

Operation 306A: Display a communication session interface associated with the preset communication application on the electronic device, the communication session interface being used to implement a communication session for the communication object.

In implementations, when a plurality of neighboring devices are detected, corresponding communication objects of the plurality of neighboring devices that are detected may be arranged and displayed according to respective distances between the neighboring devices and the electronic device in an order from the closest to the farthest. According to a result of a user selection of a displayed communication object, a communication session interface for the selected communication object is displayed. In this way, the user can manually select a detected neighboring device according to his/her need, thereby avoiding a failure in actively displaying a communication session interface corresponding to the neighboring device due to reasons such as a detection error, the neighboring device being inconvenient to approach the electronic device, etc.

In implementations, for some special scenarios, such as in a group scenario, a local user may wish to transfer a file to a smart set top box in a conference room to display to other users in the conference room. Since only one smart set-top box exists in the conference room, and there are multiple users at the same time, an electronic device used by the local user, though being able to simultaneously detect multiple neighboring devices (including the smart set-top box and electronic devices used by other users), can actively screen out the electronic devices used by the other users in the conference room, and retain the smart set top box, by separately obtaining a type of a communication object corresponding to each neighboring device and selecting a communication object of the non-user type. Furthermore, by displaying a communication session interface of the selected communication object, the local user is enabled to quickly transfer the file to the smart set-top box through the communication session interface.

In implementations, the electronic device can continuously maintain a detection of neighboring devices, i.e., monitor neighboring devices within the preset range of the electronic device. Furthermore, when a change occurs for neighboring device(s) within the preset range, the electronic device can update communication session interface(s) that is/are displayed according to a result of the change. A change of neighboring device(s) may include at least one of the following: a change of neighboring device(s) located in the preset range (for example, a change from a neighboring device 1 and a neighboring device 2 to the neighboring device 1 and a neighboring device 3), and a change in distance between the electronic device and the neighboring device(s) in the preset range (for example, a change from the neighboring device 1 being the closest and the neighboring device 2 being the second to the neighboring device 2 being the closest and the neighboring device 1 being the second). By continuously monitoring neighboring devices and subsequently updating displayed communication session interface(s) in real time, it is possible to adapt to change(s) in relative positional relationship(s) between the electronic device and the neighboring device(s). For example, when being located in a first conference room, the electronic device can detect a first smart set-top box in the first conference room, and display a corresponding communication session interface. After leaving the first conference room and entering into a second conference room, the electronic device can detect a second smart set-top box in the second conference room, and display a corresponding communication session interface, without the need of performing adaptation and adjustment manually by a user.

Figure 3B:
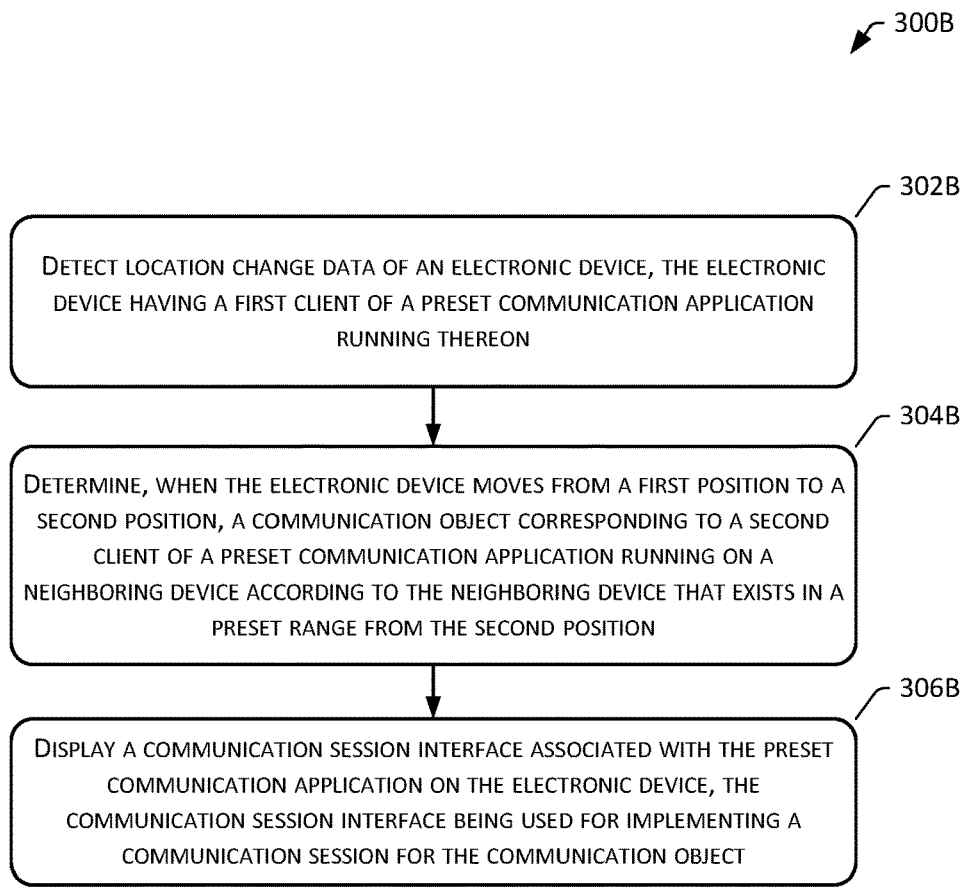
FIG. 3B is a flowchart of another communication method according to an exemplary embodiment of the present disclosure.

Similarly, in conjunction with a process of switching interfaces of an electronic device in under a geographical change, FIG. 3B is a flowchart of another communication method 300B provided by an exemplary embodiment of the present disclosure. As shown in FIG. 3B, the method 300B is applied to an electronic device and may include the following operations.

Operation 302B: Detect location change data of an electronic device, the electronic device having a first client of a preset communication application running thereon.

In implementations, the location change data refers to data related to a geographical location of the electronic device and its change, such as positioning data detected by a positioning module such as a GPS chip in the electronic device, or indoor positioning data obtained after detecting a neighboring beacon (ibeacon) by a Bluetooth chip in the electronic device. For another example, the electronic device is assumed to detect a first neighboring device at a first position. When the electronic device moves from the first position to a second position, a second neighboring device is detected around the second position. In this case, the electronic device can determine a change in a geographic location thereof based on switching and changing of neighboring devices that are detected, thereby obtaining corresponding location change data. Apparently, the location change data may also include any other form of location change data, which is not enumerated herein.

Operation 304B: Determine, when the electronic device moves from a first position to a second position, a communication object corresponding to a second client of a preset communication application running on a neighboring device according to the neighboring device that exists in a preset range from the second position.

Operation 306B: Display a communication session interface associated with the preset communication application on the electronic device, the communication session interface being used for implementing a communication session for the communication object.

In implementations, operations 304B-306B can refer to the operations 304A-306A in the embodiment as shown in FIG. 3A, and details thereof are not repeatedly described herein.

As can be seen from the above technical solutions, through an automatic detection operation of an electronic device, the present disclosure can actively display a corresponding communication session interface on the electronic device for a neighboring device having a client of a preset communication application running thereon nearby, without the need of a user to manually browse, find and open the communication session interface. This not only saves corresponding time and effort, but also greatly simplifies user operations and helps improving the efficiency of communications between communication objects.

Figure 4:
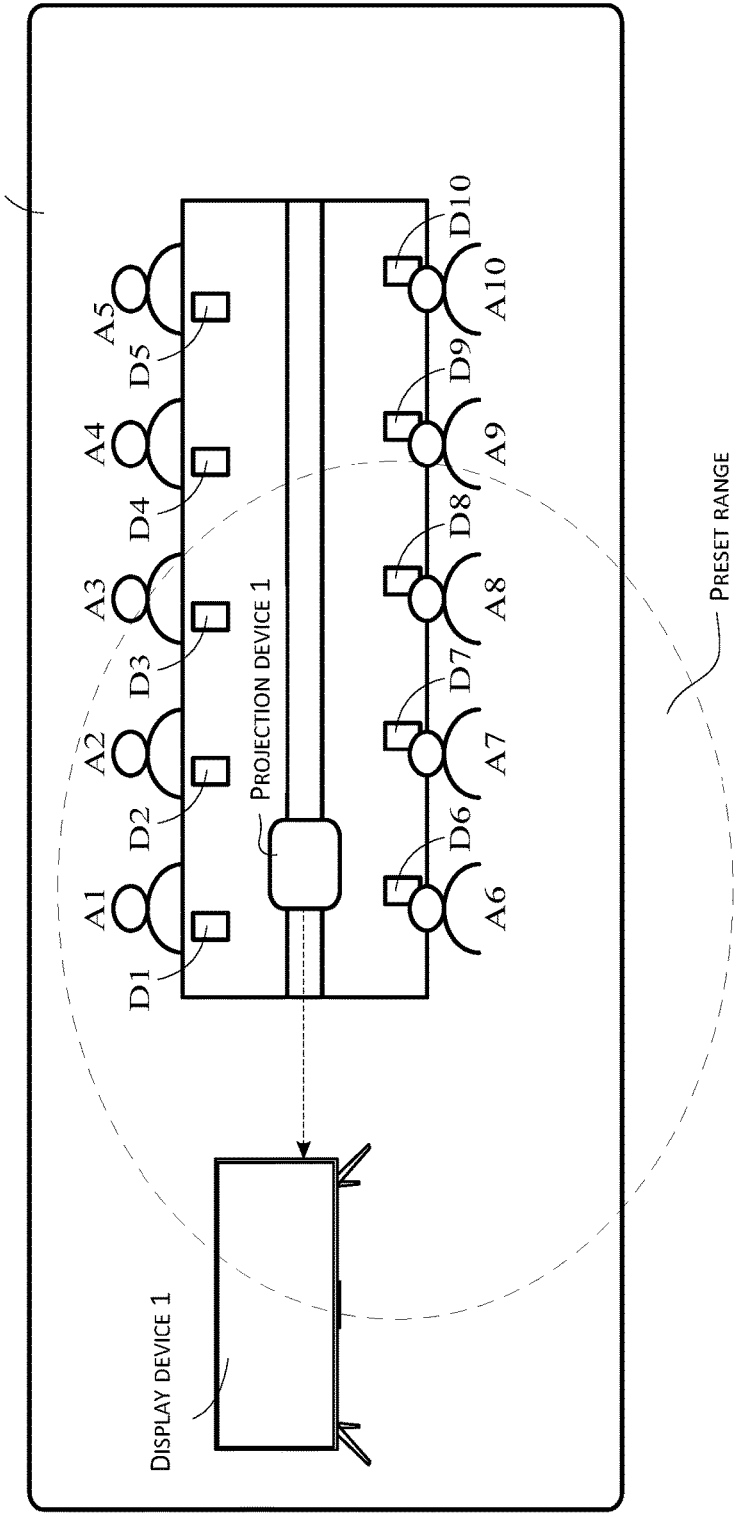
FIG. 4 is a schematic diagram of a communication scenario according to an exemplary embodiment of the present disclosure.

An enterprise instant messaging application, such as an instant communication application, is taken as an example to describe the technical solutions of the present disclosure in detail for a conference projection link in an enterprise scenario. FIG. 4 is a schematic diagram of a communication scenario 400 provided by an exemplary embodiment of the present disclosure. As shown in FIG. 4, an enterprise member A1, an enterprise member A2, . . . , an enterprise member A10, etc., in an enterprise AA are assumed to have a meeting in a conference room 1, and an enterprise member A6 wants to perform a screen projection onto a display device 1 through a projection device 1 in the conference room 1, and show contents of files such as pictures and documents, etc., that are needed in the meeting onto the display device 1.

Figure 5:
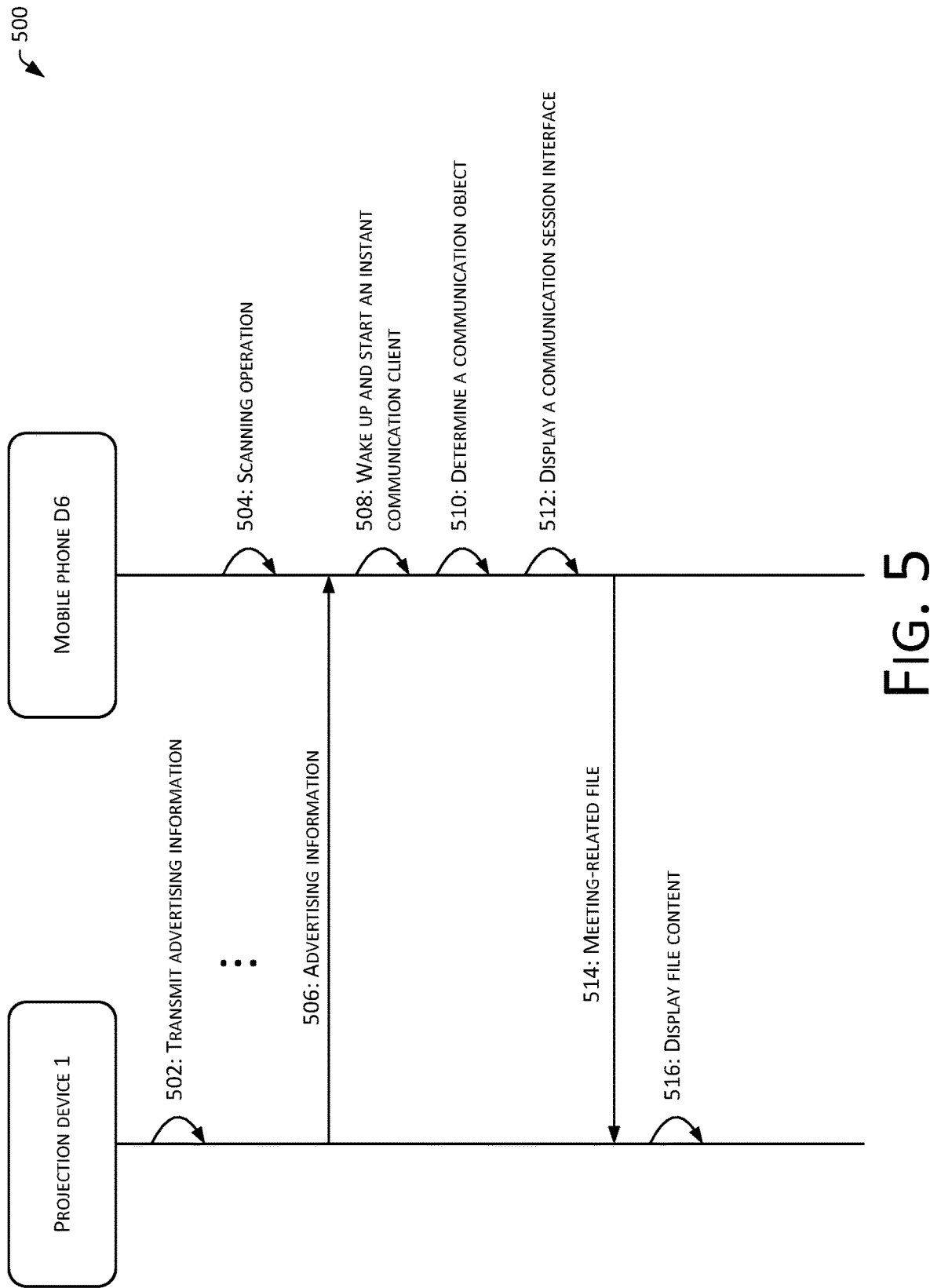
FIG. 5 is a flowchart of still another communication method according to an exemplary embodiment of the present disclosure.

For the above scenario as shown in FIG. 4, FIG. 5 is a flowchart of another communication method 500 provided by an exemplary embodiment of the present disclosure. As shown in FIG. 5, the method 500 may include the following operations.

Operation 502: The projection device 1 transmits advertising information.

In implementations, the projection device 1 is assumed to adopt an ibeacon protocol based on BLE technology, and the projection device 1 can repeatedly transmit advertising information on a default transmission channel according to a default transmission time period.

In implementations, the "projection device" may be a hardware device such as a smart set-top box running with an instant communication client. The smart set-top box implements services and functions related to the present disclosure through the instant communication client. A registered account of the enterprise member A6 is logged in an instant communication client that runs on a mobile phone D6, so that the mobile phone D6 or the instant communication client running on the mobile phone D6 is configured to be a communication object corresponding to the enterprise member A6. Similarly, a registered account corresponding to the projection device 1 is logged in an instant communication client running on the projection device 1, such that the projection device 1 or the instant communication client running on the projection device 1 is configured to be a communication object corresponding to the projection device 1.

Operation 504: The mobile phone D6 performs a scanning operation.

Operation 506: The mobile phone D6 receives the advertising information transmitted by the projection device 1.

In implementations, the mobile phone D6 can scan a preset channel according to a preset scanning time period based on the BLE technology. As shown in FIG. 4, when the mobile phone D6 performs a scanning operation, a preset range with the mobile phone D6 as the center and a preset distance as a radius can be formed, and advertising information sent by electronic device(s) within the preset range can be scanned and found. Therefore, when the projection device 1 is located within the preset range, the mobile phone D6 can scan and obtain the advertising information transmitted by the projection device 1.

Operation 508: An operating system of the mobile phone D6 wakes up and starts an instant communication client.

In implementations, when the instant communication client has been running on the mobile phone D6, operation 508 may be omitted, and operation 510 and other subsequent processing operations are directly transferred into. When the instant communication client is not running on the mobile phone D6, the mobile phone D6 can actively wake up and start the instant communication client by the following means: when the enterprise member A6 has the permission to open the projection device 1, the instant communication client can obtain a UUID (Universally Unique Identifier), etc., of the projection device 1 from an instant communication server, and register the UUID is into an operating system of the mobile phone D6 beforehand. At the same time, the UUID of the projection device 1 is also included in the transmitted advertising information. As such, when the mobile phone D6 receives the advertising information and parses the UUID included therein, the mobile phone D6 can proactively wake up and start the instant communication client in response to determining that the UUID has been registered by the instant communication client, and the instant communication client processes the advertising information.

Apparently, the mobile phone D6 may also not actively wake up and start the instant communication client. In this case, the enterprise member A6 can manually start the instant communication client on the mobile phone D6, and the instant communication client processes the advertising information received by the mobile phone D6.

Operation 510: The instant communication client running on the mobile phone D6 determines a communication object corresponding to a sender of the advertising information.

In implementations, the instant communication client running on the mobile phone D6 can query and determine a communication object corresponding to the UUID according to the UUID included in the advertising information. For example, the mobile phone D6 may store a local contact information database, and the local contact information database records a respective UUID corresponding to each contact. As such, the mobile phone D6 may determine a communication object corresponding to the current UUID accordingly. Alternatively, the mobile phone D6 can upload the UUID included in the advertising information to the instant communication server, and the instant communication server determines the corresponding communication object and informs the mobile phone D6 of the corresponding communication object.

Operation 512: The instant communication client running on the mobile phone D6 displays a communication session interface.

In implementations, the enterprise member A6 only needs to bring the mobile phone D6 close to the projection device 1, in order for the instant communication client running on the mobile phone D6 to actively display a communication session interface corresponding to the projection device 1 without the need of the enterprise member A6 to manually browse and find a session interface entry or contact information (for example, the contact information may be located under a "smart device" directory under "Enterprise AA" as shown in FIG. 2) corresponding to the projection device 1. This can not only simplify operations of the enterprise member A6, but can also enable the enterprise member A6 to send the files related to the meeting to the projection device 1 through the communication session interface as soon as possible. Therefore, the efficiency of communication between the enterprise member A6 and the projection device 1 is improved.

Operation 514: The mobile phone D6 sends a file that is related to a meeting to the projection device 1 through the communication session interface that is displayed.

Operation 516: The projection device 1 displays corresponding file content for the received file that is related to the meeting.

In implementations, the enterprise member A6 can send various types of meeting-related files such as pictures, documents, videos, and the like to the projection device 1, which is not limited by the present disclosure. After receiving a meeting-related file, the projection device 1 can open the meeting-related file and perform a projection onto the display device 1 as shown in FIG. 4 to display corresponding file content.

Furthermore, the mobile phone D6 can continuously scan for advertising information in the preset range to monitor changes of neighboring devices in the preset range. When a change of neighboring device(s) in the preset range occurs, the instant communication client running on the mobile phone D6 can update the displayed communication session interface according to a result of the change. For example, the enterprise member A6 is initially located in the conference room 1 as shown in FIG. 4, and the mobile phone D6 displays the communication session interface for the projection screen device 1 by scanning and obtaining the advertising information transmitted by the projection device 1. The enterprise member A6 is then moved from the conference room 1 to a conference room 2. The mobile phone D6 determines that the projection screen device 1 disappears from the preset range, and scans and finds a projection screen device 2 through continuous monitoring. In this case, through the process of handling as shown in FIG. 5, the communication session interface for the projection device 1 can be switched to a communication session interface for the projection device 2, so that the enterprise member A6 can quickly realize a communication operation with the projection device 2, for example, sending a file related to a meeting to the projection device 2 for projection and display in the conference room 2.

Figure 6:
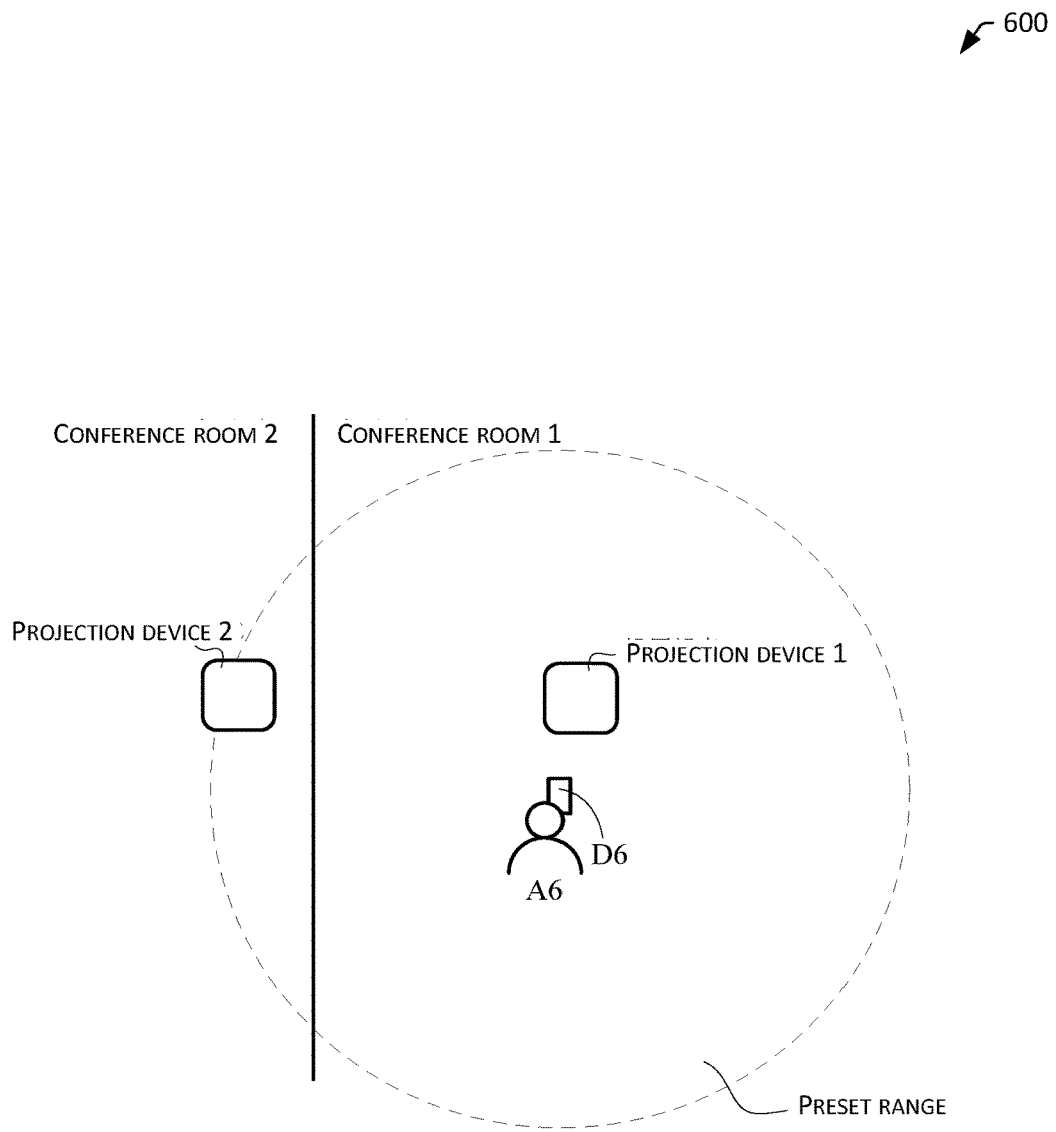
FIG. 6 is a schematic diagram of another communication scenario according to an exemplary embodiment of the present disclosure.

FIG. 6 is a schematic diagram of another communication scenario 600 provided by an exemplary embodiment of the present disclosure. As shown in FIG. 6, the enterprise member A6 is assumed to be located in the conference room 1, and desires to establish a communication session with the projection device 1 through the mobile phone D6, and perform a display projection based on the projection device 1 in the conference room 1. In this case, the mobile phone D6 can scan for advertising information within the preset range using the process of handling as shown in FIG. 5. In the scenario 600 shown in FIG. 6, the projection device 1 in the conference room 1 and the projection device 2 in the conference room 2 are assumed to be located within the preset range corresponding to the mobile phone D6. The mobile phone D6 may separately scan and obtain respective advertising information from the projection device 1 and the projection device 2. In other words, the mobile phone D6 detects multiple neighboring devices within the preset range.

Figure 7:
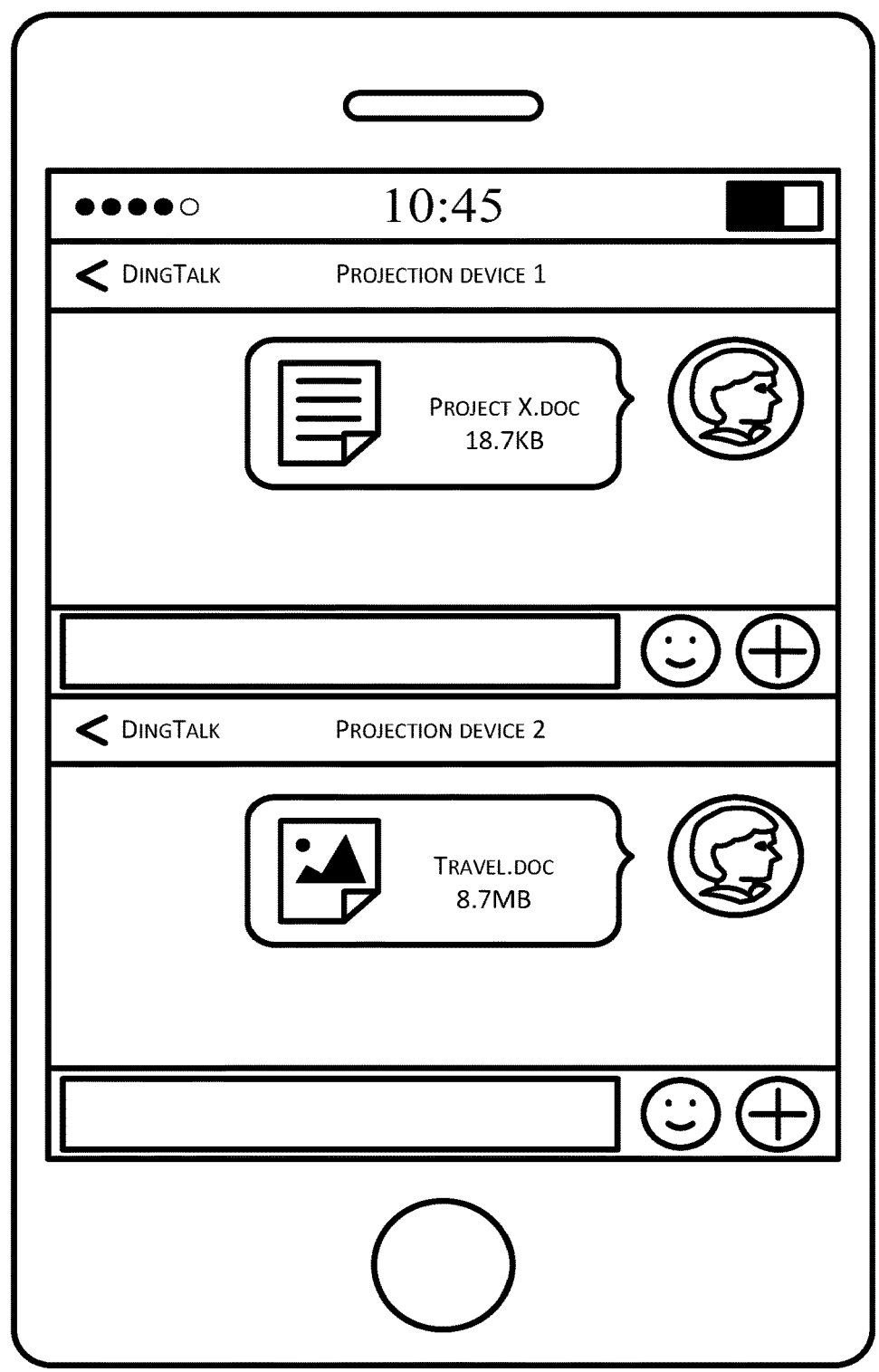
FIG. 7 is a schematic diagram of a function page of an instant communication client according to an exemplary embodiment of the present disclosure.

In implementations, the mobile phone D6 can simultaneously display respective communication session interfaces corresponding to the projection device 1 and the projection device 2, especially when a screen size of the mobile phone D6 is large. As shown in FIG. 7, a tile display of a communication session interface corresponding to the projection device 1 and a communication session interface 2 corresponding to the projection device 2 can be performed in the same screen, so that the enterprise member A6 can freely select a communication session interface that is desired to be used.

However, when a large number of neighboring devices exist within the preset range, a display area of each communication session interface may be too small if respective communication session interfaces corresponding to all the scanned neighboring devices are displayed in the mobile phone D6. This will make it difficult for the enterprise member A6 to perform corresponding communication operations.

Therefore, in implementations, the mobile phone D6 can separately obtain a separation distance between itself and each neighboring device within the preset range, select a preset number of neighboring devices from among multiple neighboring devices according to corresponding separation distances in an order from the nearest to the farthest, and display communication session interfaces corresponding to the selected neighboring devices only. For example, when the mobile phone D6 scans and finds the projection device 1 and the projection device 2, the mobile phone D6 can determine an order of distances with the projection device 1 and the projection device 2, select a neighboring device that is closest to the mobile phone D6 only (for example, select the projection device 1 only), and display a corresponding communication session interface, thereby avoiding interference caused by other neighboring devices such as the projection device 2 in the surroundings.

The mobile phone D6 can separately calculate separation distances from the projection device 1 and the projection device 2, and then determine an order of distances between itself and the projection device 1 and the projection device 2 according to sizes of the separation distances. Alternatively, the mobile phone D6 can determine RSSI (Received Signal Strength Indication) values of respective advertising information corresponding to the projection device 1 and the projection device 2, for example, and determine an order of distances between itself and the projection device 1 and the projection device 2 according to magnitudes of the RSSI values. The larger a RSSI value is, the smaller a distance between the mobile phone D6 and a corresponding neighboring device is.

Figure 8:
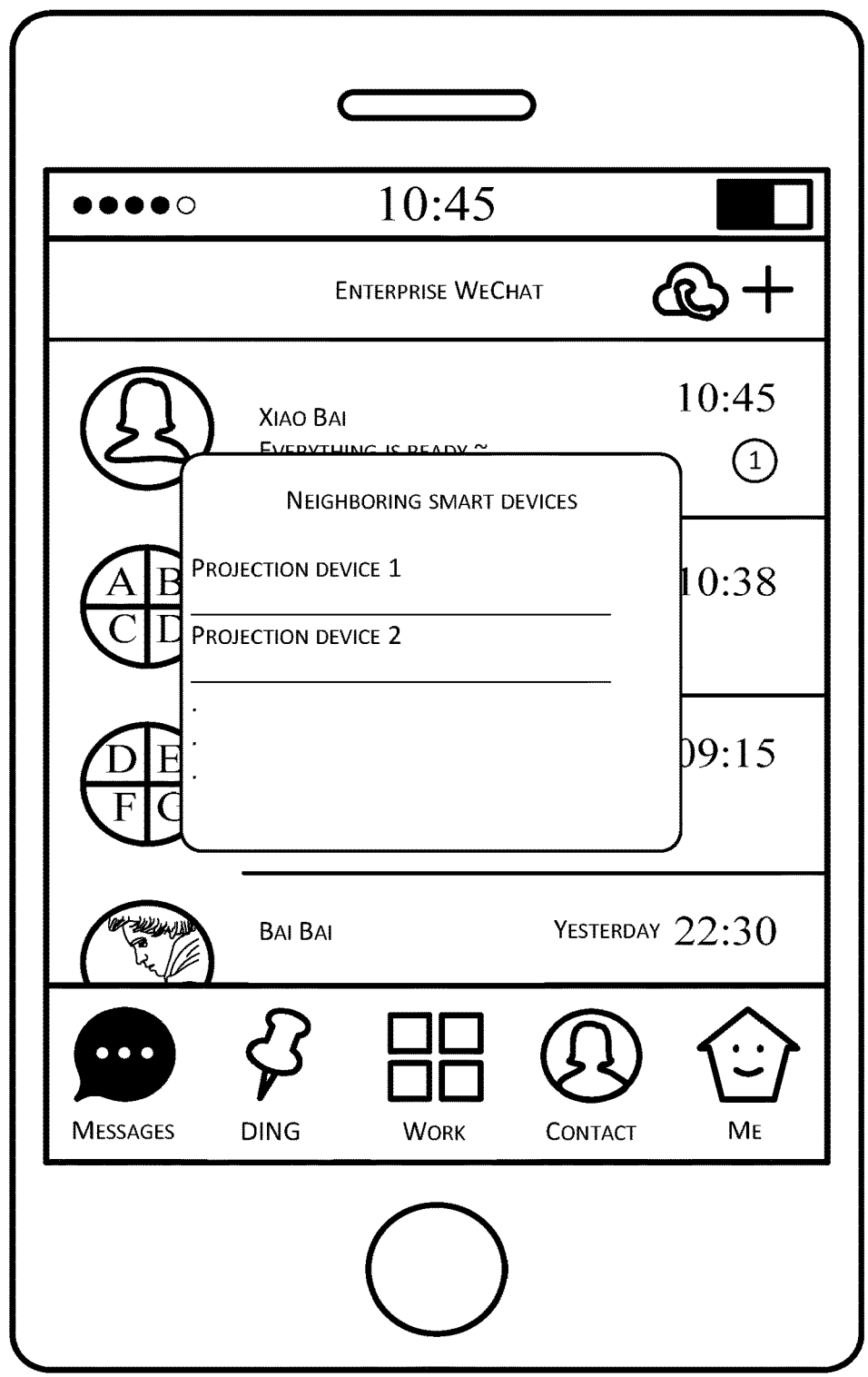
FIG. 8 is a schematic diagram of a function page of an instant communication client according to an exemplary embodiment of the present disclosure.

In another embodiment, the mobile phone D6 can separately obtain a separation distance between itself and each neighboring device within the preset range, and display communication objects corresponding to a plurality of neighboring devices that are detected according to corresponding separation distances in an order from the nearest to the farthest, to allow the enterprise member A6 to make a selection from the displayed neighboring devices. The mobile phone D6 then only displays a communication session interface for a communication object that is selected. Scanning and finding the projection device 1 and the projection device 2 by the mobile phone D6 is still used as an example. Although the mobile phone D6 can determine an order of separation distances from the projection device 1 and the projection device 2, in order to avoid a detection error of the mobile phone D6 on the one hand, and to satisfy actual needs of the enterprise member A6 on the other hand (e.g., the projection device 1 and the projection device 2 are both in fact located in the same conference room, and the enterprise member A6 just needs to communicate with the projection device 2 that is farther away), the mobile phone D6 can present a pop-up window as shown in FIG. 8, and display respective information of the projection device 1 and the projection device 2 that are scanned and found in the pop-up window, thereby providing a greater freedom of choices and operations.

It should be noted:
1. As shown in FIG. 4, although the mobile phone D6 is taken as an example in the above embodiments, similar technical solutions can be implemented for the mobile phone D1 and the mobile phone D2 used by other enterprise members to actively display corresponding communication session interfaces of the projection device 1, which is not redundantly described herein.

2. The technical solutions of the present disclosure can be applied to the mobile phone D6 and the projection device 1 as mentioned above, i.e., a process of communication between a user-type electronic device (the communication object corresponding to the mobile phone D6 is the user A6) and a non-user-type electronic device (the communication object corresponding to the projection device 1 is a hardware projection device), and can also be applied between user-type electronic devices. For example, as shown in FIG. 4, the mobile phone D6 can scan and find the mobile phone D1, the mobile phone D2, the mobile phone D3, the mobile phone D7, and the mobile phone D8, etc., within the preset range. For the scanning of one or more neighboring devices that are scanned and found, a processing method of the mobile phone D6 can be referenced to the projection device 1, the projection device 2, etc., as described above, and details thereof are not repeatedly described herein.

For the scenario as shown in FIG. 4, the mobile phone D6 may also scan and find user-type electronic devices such as the mobile phone D1, the mobile phone D2, the mobile phone D3, the mobile phone D7, and the mobile phone D8, etc., and non-user type of electronic devices such as the projection device 1 and the like, within the preset range. When the user A6 is in the conference scenario as shown in FIG. 4, and when the user A6 uses the technical solutions of the present disclosure on the mobile phone D6, the user A6 often has a greater probability of using a hardware device such as the projection device 1, rather than conducting communications with other users. Therefore, when multiple neighboring devices are scanned and found at the same time, the mobile phone D6 can separately determine a type of a communication object corresponding to each neighboring device, select a communication object of a non-user type, and then display a communication session interface for the selected communication object. For example, although the mobile phone D6 scans and finds a plurality of neighboring devices in FIG. 4, only a communication session interface corresponding to the projection device 1 is displayed, and corresponding communication session interfaces of the mobile phone D1 and the mobile phone D2, etc., are not displayed.

Apparently, after user-type communication object(s) is/are filtered out, the preset range of the mobile phone D6 usually includes only one hardware device, such as the projection device 1 as shown in FIG. 4. In this case, the mobile phone D6 can only present a communication session interface corresponding to the projection device 1. In some special scenarios, the preset range of the mobile phone D6 may include multiple hardware devices. In that case, the mobile phone D6 may perform processing with reference to the above-mentioned situations in which the projection device 1 and the projection device 2 are scanned and found at the same time, which are not repeatedly described herein.

Figure 9:
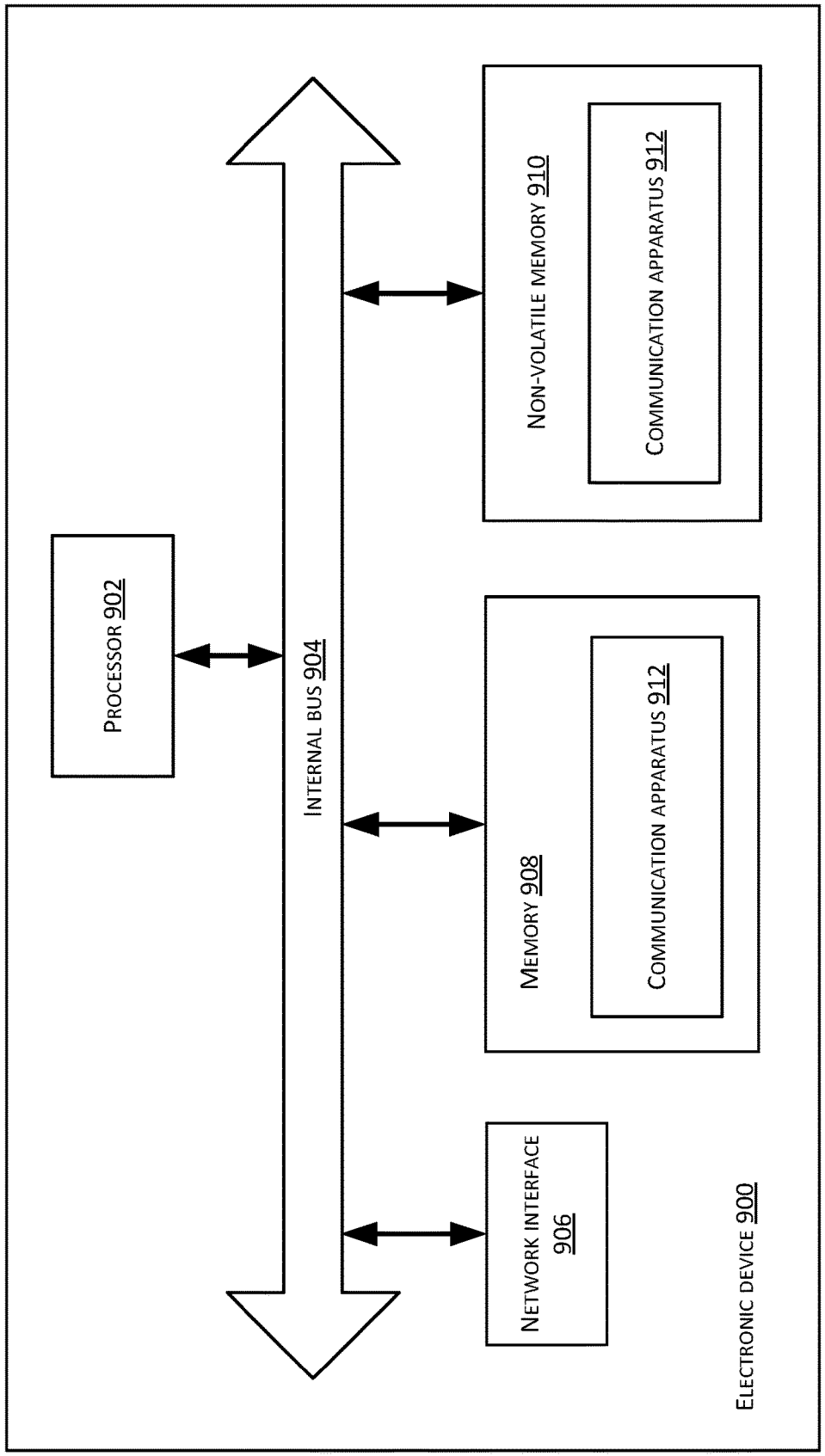
FIG. 9 is a schematic structural diagram of an electronic device according to an exemplary embodiment of the present disclosure.

FIG. 9 shows a schematic structural diagram of an electronic device 900 according to an exemplary embodiment of the present disclosure. Referring to FIG. 9, at a hardware level, the electronic device 900 includes a processor 902, an internal bus 904, a network interface 906, a memory 908, and a non-volatile memory 910, and apparently may also include hardware needed by other services. The processor 902 reads a corresponding computer program from the non-volatile memory 910 into the memory 902, and then operates to form a communication apparatus 912 at a logical level. Apparently, in addition to software implementations, the present disclosure does not exclude other ways of implementation, such as a logic device or a combination of software and hardware, etc. In other words, an execution entity of the following process of processing is not limited to each logical unit, and may be hardware or logic device(s).

Figure 10:
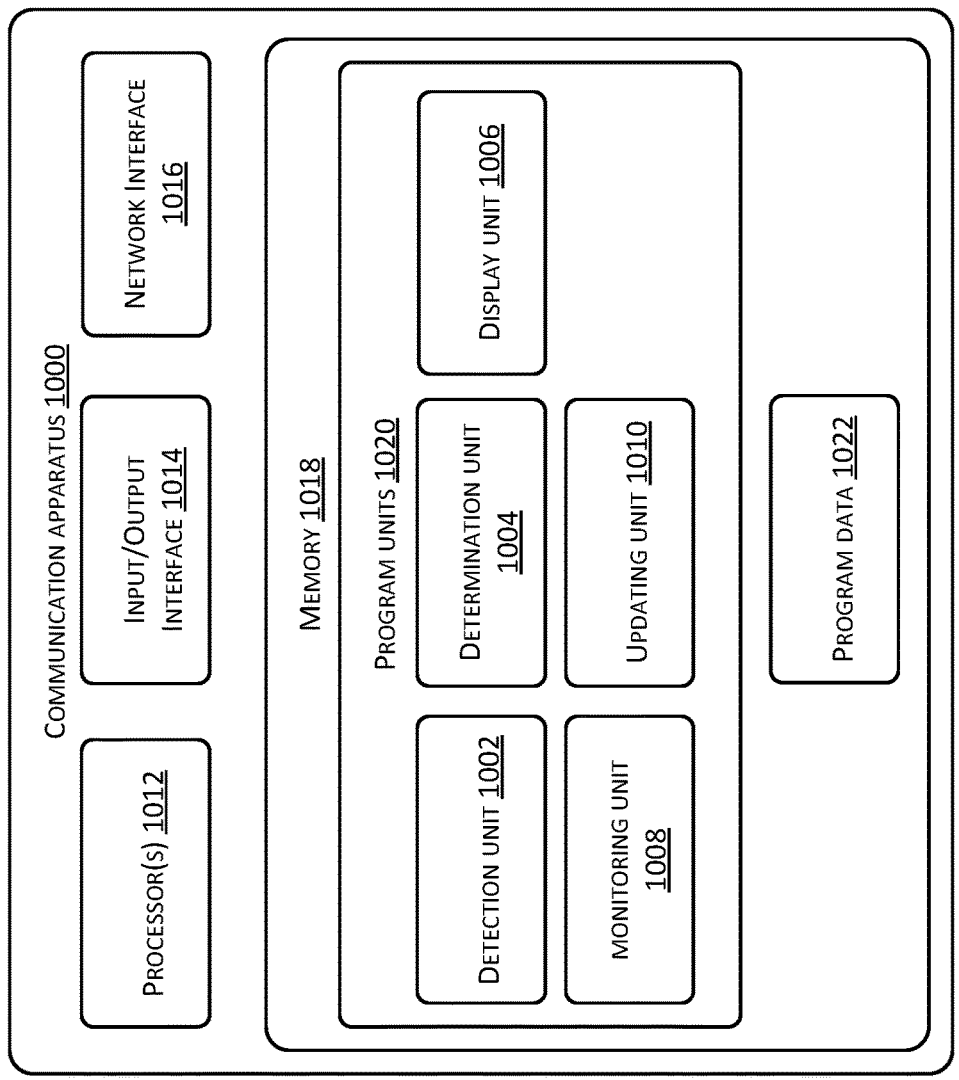
FIG. 10 is a block diagram of a communication apparatus according to an exemplary embodiment of the present disclosure.

Referring to FIG. 10, in implementations, a communication apparatus 1000 may include a detection unit 1002, a determination unit 1004, and a display unit 1006, wherein:

the detection unit 1002 detects neighboring device(s) within a preset range in a vicinity of an electronic device, the electronic device having a first client of a preset communication application running thereon;

the determination unit 1004 determines a communication object corresponding to a second client of the preset communication application running on a neighboring device in response to detecting that the neighboring device exists in the vicinity of the electronic device; and the display unit 1006 displays a communication session interface for the communication object in a function page corresponding to the first client.

Optionally, the detection unit 1002 is specifically configured to scan for a notification signal that is sent according to a preset near-field communication method, wherein a transmission range of the notification signal is the preset range; and the determination unit 1004 is specifically configured to extract information of the communication object corresponding to the second client from the notification signal that is scanned and found.

Optionally, the determination unit 1004 is specifically configured to select a preset number of neighboring devices from a plurality of neighboring devices that are detected according to separation distances between the plurality of neighboring devices and the electronic device in an order from the nearest to the farthest in response to detecting the plurality of neighboring devices; and determine respective communication objects corresponding to the selected neighboring devices to display corresponding communication session interfaces.

Optionally, the display unit 1006 is specifically configured to select a preset number of neighboring devices from a plurality of neighboring devices that are detected according to separation distances between the plurality of neighboring devices and the electronic device in an order from the nearest to the farthest in response to detecting the plurality of neighboring devices; and display, based on a result of user selection of a displayed communication object, a communication session interface for the selected communication object.

Optionally, the display unit 1006 is specifically configured to determine respective types of communication objects corresponding to a plurality of neighboring devices in response to detecting the plurality of neighboring devices; and select a non-user type communication object, and display a communication session interface for the selected communication object.

Optionally, the apparatus further includes:

a monitoring unit 1008 that monitors neighboring devices in the preset range; and an updating unit 1010 that updates the displayed communication session interface according to a result of change when a change occurs for the neighboring devices in the preset range.

In implementations, the apparatus 1000 may further include one or more processors 1012, an input/output interface 1014, a network interface 1016, and a memory 1018.

The memory 1018 may include a form of computer readable media such as a volatile memory, a random access memory (RAM) and/or a non-volatile memory, for example, a read-only memory (ROM) or a flash RAM. The memory 1018 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1018 may include program units 1020 and program data 1022. The program units 1020 may include one or more units as described in the foregoing description and FIG. 10.

Figure 11:
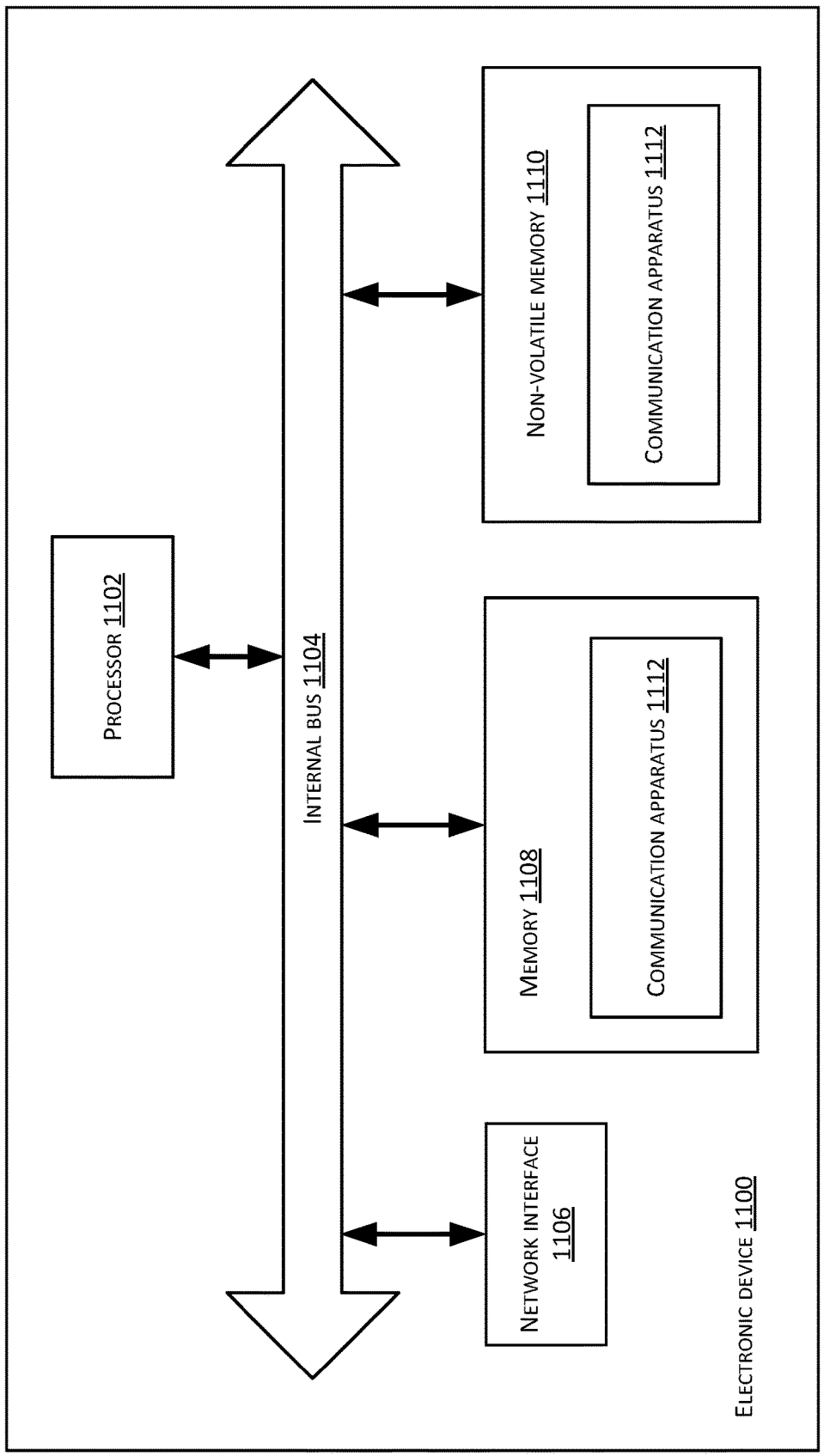
FIG. 11 is a schematic structural diagram of an electronic device according to an exemplary embodiment of the present disclosure.

FIG. 11 shows a schematic structural diagram of an electronic device 1100 according to an exemplary embodiment of the present disclosure. Referring to FIG. 11, at a hardware level, the electronic device includes a processor 1102, an internal bus 1104, a network interface 1106, a memory 1108, and a non-volatile memory 1110, and apparently may also include hardware needed by other services. The processor 1102 reads a corresponding computer program from the non-volatile memory 1110 into the memory 1102, and then operates to form a communication apparatus 1112 at a logical level. Apparently, in addition to software implementations, the present disclosure does not exclude other ways of implementation, such as a logic device or a combination of software and hardware, etc. In other words, an execution entity of the following process of processing is not limited to each logical unit, and may be hardware or logic device(s).

Figure 12:
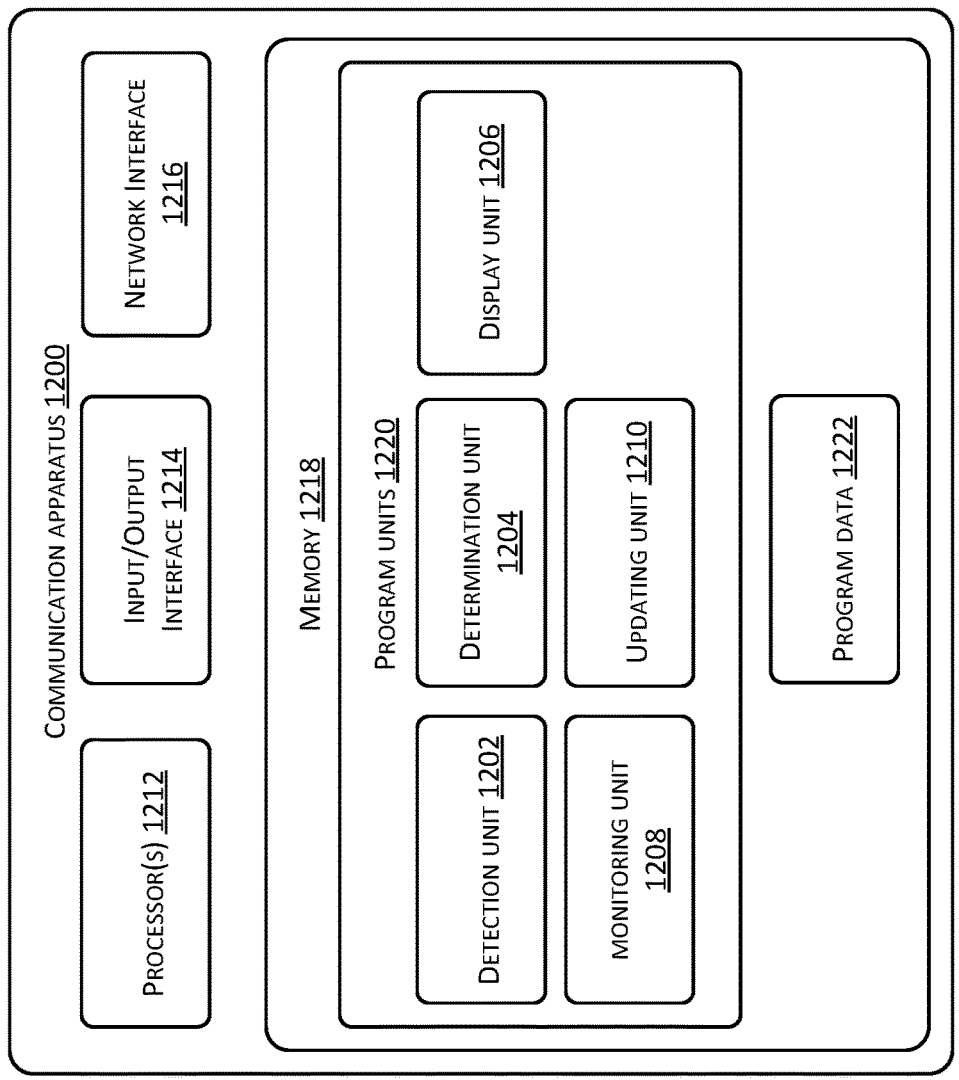
FIG. 12 is a block diagram of a communication apparatus according to an exemplary embodiment of the present disclosure.

Referring to FIG. 12, in implementations, a communication apparatus 1200 may include a detection unit 1202, a determination unit 1204, and a display unit 1206, wherein:

the detection unit 1202 detects location change data of an electronic device, the electronic device having a first client of a preset communication application running thereon;

the determination unit 1204 determines, when the electronic device is moved from a first position to a second position, communication object(s) corresponding to second client(s) of the preset communication application running on neighboring device(s) according to an existence of the neighboring device(s) in a preset range in a vicinity of the second position; and the display unit 1206 displays communication session interface(s) associated with the preset communication application in the electronic device, the communication session interface(s) being used for implementing respective communication session(s) for the communication object(s).

Optionally, the detection unit 1202 is specifically configured to scan notification signal(s) that is/are sent according to a preset near-field communication method, wherein a transmission range of the notification signal(s) is the preset range; and the determination unit 1204 is specifically configured to extract information of the communication object (s) corresponding to the second client(s) from the notification signal(s) that are scanned and found.

Optionally, the determination unit 1204 is specifically configured to select a preset number of neighboring devices from a plurality of neighboring devices that are detected according to respective separation distances between the plurality of neighboring devices and the electronic device in an order from the nearest to the farthest in response to detecting the plurality of neighboring devices; and determine communication objects corresponding to the selected neighboring devices to display corresponding communication session interfaces.

Optionally, the display unit 1206 is specifically configured to select a preset number of neighboring devices from a plurality of neighboring devices that are detected according to separation distances between the plurality of neighboring devices and the electronic device in an order from the nearest to the farthest in response to detecting the plurality of neighboring devices; and display, based on a result of user selection of a displayed communication object, a communication session interface for the selected communication object.

Optionally, the display unit 1206 is specifically configured to determine respective types of communication objects corresponding to a plurality of neighboring devices in response to detecting the plurality of neighboring devices; and select a non-user type communication object, and display a communication session interface for the selected communication object.

Optionally, the apparatus further includes:

a monitoring unit 1208 that monitors neighboring devices in the preset range; and an updating unit 1210 that updates the displayed communication session interface according to a result of change when a change occurs for the neighboring devices in the preset range.

In implementations, the apparatus 1200 may further include one or more processors 1212, an input/output interface 1214, a network interface 1216, and a memory 1218. The memory 1218 may include a form of computer readable media as described in the foregoing description.

In implementations, the memory 1218 may include program units 1220 and program data 1222. The program units 1220 may include one or more units as described in the foregoing description and FIG. 12.

The systems, apparatuses, modules, or units illustrated in the above embodiments may be implemented by a computer chip or an entity, or implemented by a product having certain functions. A typical device of implementation is a computer, and a specific form of the computer may be a personal computer, a laptop computer, a cellular phone, a camera phone, a smart phone, a personal digital assistant, a media player, a navigation device, an email transceiver, and a game controller, a tablet computer, a wearable device, or a combination of any of these devices. In a typical configuration, a computer includes one or more processors (CPUs), an input/output interface, a network interface, and a memory.

It is also noted that terms "include", "contain" or any other variations are intended to encompass a non-exclusive inclusion, such that a process, method, product, or device that includes a series of elements not only includes these elements, but also includes other elements that are not explicitly listed, or also includes elements that are inherent to such process, method, product, or device. Without further limitation, an element that is defined by a phrase "comprising a . . . " does not exclude the presence of other identical elements in a process, method, product, or device that includes the element.

Exemplary embodiments are described in detail herein, and examples thereof are illustrated in the accompanying drawings. When the accompanying drawings are involved in the following description, same or similar numbers in different figures represent same or similar elements, unless indicated otherwise. Implementations described in the following exemplary embodiments do not represent all the embodiments that are consistent with the present disclosure. Instead, they are merely examples of apparatuses and methods that are consistent with some aspects of the present disclosure as detailed in the appended claims.

Terminologies used in the present disclosure are merely for the purpose of describing particular embodiments, and are not intended to limit the present disclosure. Singular forms "a", "said" and "the" are intended to include plural forms, unless stated clearly in the context otherwise. It should also be understood that a term "and/or" used herein refers to and includes any or all possible combinations of one or more of associated items that are listed.

It should be understood that, although terms such as first, second, third, etc. may be used in the present disclosure to describe various types of information, these pieces of information should not be limited to these terms. These terms are merely used for distinguishing information of the same type. For example, without departing from the scope of the present disclosure, first information may also be referred to as second information, and similarly, the second information may also be referred to as the first information. Depending on the context, a term "if" used herein may be interpreted as "when" or "in an event of" or "in response to determining".

The above description merely corresponds to exemplary embodiments of the present disclosure, and is not intended to limit the present disclosure. Any modifications, equivalent replacements, improvements, etc. that are made within the spirit and principles of the present disclosure are included in the scope of protection of the present disclosure.

The present disclosure can be further understood using the following clauses.

Clause 1: A communication method comprising: detecting neighboring devices within a preset range in a vicinity of an electronic device, the electronic device having a first client of a preset communication application running thereon; determining a communication object corresponding to a second client of the preset communication application running on a neighboring device in response to detecting that the neighboring device exists in the vicinity of the electronic device; and displaying a communication session interface associated with the preset communication application on the electronic device, the communication session interface being used for implementing a communication session for the communication object.

Clause 2: The method of Clause 1, wherein detecting the neighboring devices within the preset range in the vicinity of the electronic device comprises scanning for a notification signal that is sent according to a preset near-field communication method, wherein a transmission range of the notification signal is the preset range; and determining the communication object corresponding to the second client of the preset communication application running on the neighboring device comprises extracting information of the communication object corresponding to the second client from the notification signal that is scanned and found.

Clause 3: The method of Clause 1, wherein determining the communication object corresponding to the second client of the preset communication application running on the neighboring device comprises: selecting a preset number of neighboring devices from a plurality of neighboring devices that are detected according to separation distances between the plurality of neighboring devices and the electronic device in an order from the nearest to the farthest in response to detecting the plurality of neighboring devices; and determining respective communication objects corresponding to the selected neighboring devices to display corresponding communication session interfaces.

Clause 4: The method of Clause 1, wherein determining the communication object corresponding to the second client of the preset communication application running on the neighboring device comprises: selecting a preset number of neighboring devices from a plurality of neighboring devices that are detected according to separation distances between the plurality of neighboring devices and the electronic device in an order from the nearest to the farthest in response to detecting the plurality of neighboring devices; and displaying, based on a result of user selection of a displayed communication object, a communication session interface for the selected communication object.

Clause 5: The method of Clause 1, wherein displaying the communication session interface for the communication object comprises: determining respective types of communication objects corresponding to a plurality of neighboring devices in response to detecting the plurality of neighboring devices; and selecting a non-user type communication object, and displaying a communication session interface for the selected communication object.

Clause 6: The method of Clause 1, further comprising: monitoring the neighboring devices in the preset range; and updating the displayed communication session interface according to a result of change when a change occurs for the neighboring devices in the preset range.

Clause 7: A communication apparatus comprising: a detection unit that detects neighboring devices within a preset range in a vicinity of an electronic device, the electronic device having a first client of a preset communication application running thereon; a determination unit that determines a communication object corresponding to a second client of the preset communication application running on a neighboring device in response to detecting that the neighboring device exists in the vicinity of the electronic device; and a display unit that displays a communication session interface for the communication object in a function page corresponding to the first client.

Clause 8: The apparatus of Clause 7, wherein: the detection unit is specifically configured to scan for a notification signal that is sent according to a preset near-field communication method, wherein a transmission range of the notification signal is the preset range; and the determination unit is specifically configured to extract information of the communication object corresponding to the second client from the notification signal that is scanned and found.

Clause 9: The apparatus of Clause 7, wherein the determination unit is specifically configured to: select a preset number of neighboring devices from a plurality of neighboring devices that are detected according to separation distances between the plurality of neighboring devices and the electronic device in an order from the nearest to the farthest in response to detecting the plurality of neighboring devices; and determine respective communication objects corresponding to the selected neighboring devices to display corresponding communication session interfaces.

Clause 10: The apparatus of Clause 7, wherein the display unit is specifically configured to: select a preset number of neighboring devices from a plurality of neighboring devices that are detected according to separation distances between the plurality of neighboring devices and the electronic device in an order from the nearest to the farthest in response to detecting the plurality of neighboring devices; and display, based on a result of user selection of a displayed communication object, a communication session interface for the selected communication object.

Clause 11: The apparatus of Clause 7, wherein the display unit is specifically configured to: determine respective types of communication objects corresponding to a plurality of neighboring devices in response to detecting the plurality of neighboring devices; and select a non-user type communication object, and display a communication session interface for the selected communication object.

Clause 12: The apparatus of Clause 7, further comprising: a monitoring unit that monitors the neighboring devices in the preset range; and an updating unit that updates the displayed communication session interface according to a result of change when a change occurs for the neighboring devices in the preset range.

Clause 13: A communication method comprising: detecting location change data of an electronic device, the electronic device having a first client of a preset communication application running thereon; determining, when the electronic device is moved from a first position to a second position, communication object(s) corresponding to second client(s) of the preset communication application running on neighboring device(s) according to an existence of the neighboring device(s) in a preset range in a vicinity of the second position; and displaying communication session interface(s) associated with the preset communication application in the electronic device, the communication session interface(s) being used for implementing respective communication session(s) for the communication object(s).

Clause 14: A communication apparatus comprising: a detection unit that detects location change data of an electronic device, the electronic device having a first client of a preset communication application running thereon; a determination unit that determines, when the electronic device is moved from a first position to a second position, communication object(s) corresponding to second client(s) of the preset communication application running on neighboring device(s) according to an existence of the neighboring device(s) in a preset range in a vicinity of the second position; and a display unit that displays communication session interface(s) associated with the preset communication application in the electronic device, the communication session interface(s) being used for implementing respective communication session(s) for the communication object(s).

What is claimed is:

1. A method implemented by an electronic device, the method comprising:
   detecting a plurality of neighboring devices within a preset range in a vicinity of the electronic device, the electronic device having a first client of a preset communication application;
   arranging and displaying corresponding communication session interfaces of multiple neighboring devices of the plurality of neighboring devices in an ascending order of respective distances between the neighboring devices and the electronic device;
   determining a communication object corresponding to a second client of the preset communication application running on a neighboring device of the multiple neighboring devices; and displaying a communication session interface associated with the preset communication application on the electronic device, the communication session interface being used for implementing a communication session for the communication object.

2. The method of claim 1, wherein detecting the plurality of neighboring devices within the preset range in the vicinity of the electronic device comprises scanning for a notification signal that is sent according to a preset near-field communication method, wherein a transmission range of the notification signal is the preset range.

3. The method of claim 2, wherein determining the communication object corresponding to the second client of the preset communication application running on the neighboring device comprises extracting information of the communication object corresponding to the second client from the notification signal that is scanned and found.

4. The method of claim 1, further comprising:
selecting the multiple neighboring devices from the plurality of neighboring devices that are detected according to separation distances between the plurality of neighboring devices and the electronic device in an order from the nearest to the farthest in response to detecting the plurality of neighboring devices.

5. The method of claim 1, further comprising:
determining respective communication objects corresponding to the multiple neighboring devices to display the corresponding communication session interfaces.

6. The method of claim 5, wherein determining the communication object corresponding to the second client of the preset communication application running on the neighboring device further comprises:
displaying, based on a result of user selection of a communication object of the respective communication objects, a communication session interface for the communication object.

7. The method of claim 1, wherein displaying the communication session interface for the communication object comprises:
determining respective types of communication objects corresponding to the plurality of neighboring devices in response to detecting the plurality of neighboring devices; and
selecting a non-user type communication object, and displaying a communication session interface for the selected communication object.

8. The method of claim 1, further comprising:
monitoring the plurality of neighboring devices in the preset range; and
updating the displayed communication session interface according to a result of change when a change occurs for the plurality of neighboring devices in the preset range.

9. An apparatus comprising:
one or more processors;
memory;
a detection unit stored in the memory and executable by the one or more processors to detect a plurality of neighboring devices within a preset range in a vicinity of an electronic device, the electronic device having a first client of a preset communication application;
a display unit stored in the memory and executable by the one or more processors to arrange and display corresponding communication session interfaces of multiple neighboring devices of the plurality of neighboring devices in an ascending order of respective distances between the neighboring devices and the electronic device; and
a determination unit stored in the memory and executable by the one or more processors to determine a communication object corresponding to a second client of the preset communication application running on a neighboring device of the multiple neighboring devices, wherein the display unit is further configured to display a communication session interface for the communication object in a function page corresponding to the first client.

10. The apparatus of claim 9, wherein the detection unit is further configured to scan for a notification signal that is sent according to a preset near-field communication method, wherein a transmission range of the notification signal is the preset range.

11. The apparatus of claim 10, wherein the determination unit is further configured to extract information of the communication object corresponding to the second client from the notification signal that is scanned and found.

12. The apparatus of claim 9, wherein the determination unit is further configured to select the multiple neighboring devices from the plurality of neighboring devices that are detected according to separation distances between the plurality of neighboring devices and the electronic device in an order from the nearest to the farthest in response to detecting the plurality of neighboring devices.

13. The apparatus of claim 9, wherein the determination unit is further configured to determine respective communication objects corresponding to the multiple neighboring devices to display the corresponding communication session interfaces.

14. The apparatus of claim 13, wherein the determination unit is further configured to display, based on a result of user selection of a communication object of the respective communication objects, a communication session interface for the communication object.

15. The apparatus of claim 9, wherein the display unit is further configured to:
determine respective types of communication objects corresponding to the plurality of neighboring devices in response to detecting the plurality of neighboring devices; and
select a non-user type communication object, and display a communication session interface for the selected communication object.

16. The apparatus of claim 9, further comprising:
a monitoring unit stored in the memory and executable by the one or more processors to monitor the plurality of neighboring devices in the preset range; and
an updating unit stored in the memory and executable by the one or more processors to update the displayed communication session interface according to a result of change when a change occurs for the plurality of neighboring devices in the preset range.

17. One or more computer readable media storing executable instructions that, when executed by one or more processors of an electronic device, cause the one or more processors to perform acts comprising:
determining, based on detected location change data of the electronic device, when the electronic device is moved from a first position to a second position, one or more communication objects corresponding to one or more second clients of a preset communication application running on one or more neighboring devices according to an existence of the one or more neighboring devices in a preset range in a vicinity of the second position; and arranging and displaying one or more communication session interfaces associated with the preset communication application in the electronic device in an ascending order of respective one or more distances between the one or more neighboring devices and the electronic device, the one or more communication session interfaces being used for implementing respective one or more communication sessions for the one or more communication objects.

18. The one or more computer readable media of claim 17, wherein the acts further comprise:

scanning for one or more notification signals that are sent according to a preset near-field communication method, wherein a transmission range of the one or more notification signals is the preset range; and extracting information of the one or more communication objects corresponding to the one or more second clients from the one or more notification signals that are scanned and found.

19. The one or more computer readable media of claim 17, wherein the acts further comprise:

selecting a preset number of neighboring devices from the one or more neighboring devices that are detected according to respective separation distances between the one or more neighboring devices and the electronic device in an order from the nearest to the farthest; and determining communication objects corresponding to the selected neighboring devices to display corresponding communication session interfaces.

20. The one or more computer readable media of claim 17, wherein the acts further comprise:

determining respective types of the one or more communication objects corresponding to the one or more neighboring devices;

selecting a non-user type communication object from among the one or more communication objects corresponding to the one or more neighboring devices; and displaying a communication session interface for the selected communication object.

* * * * *